United States Patent Office 3,379,096
Patented Apr. 23, 1968

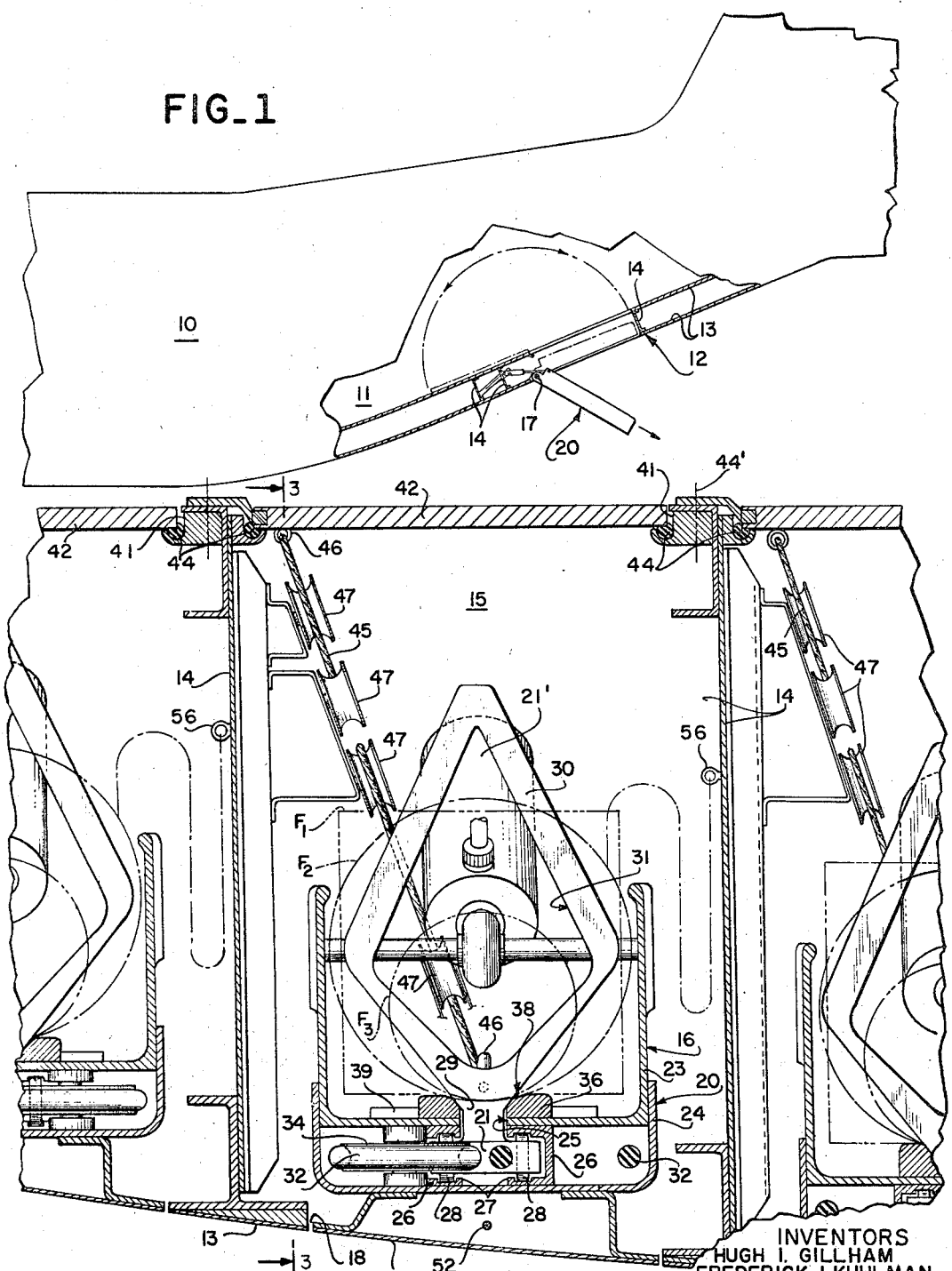

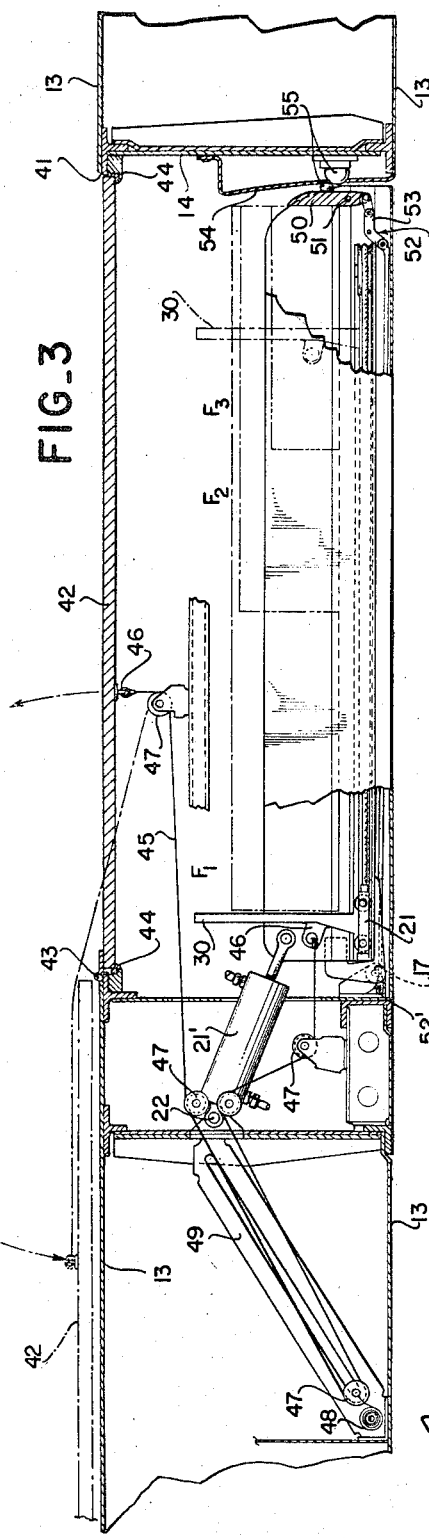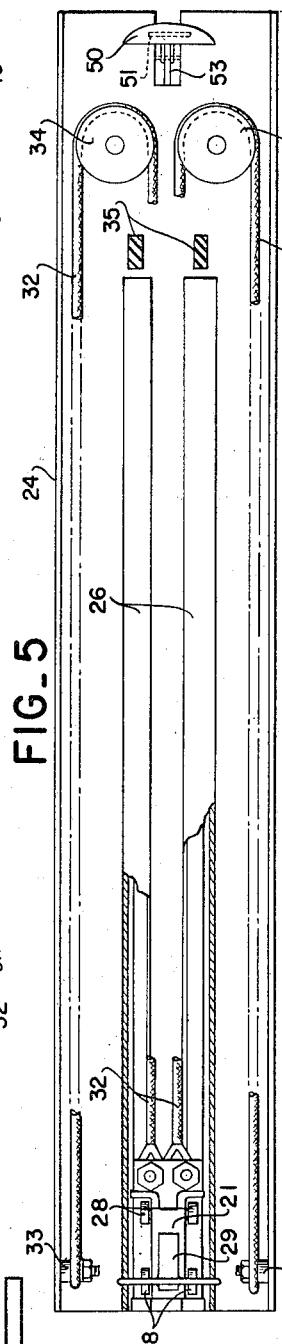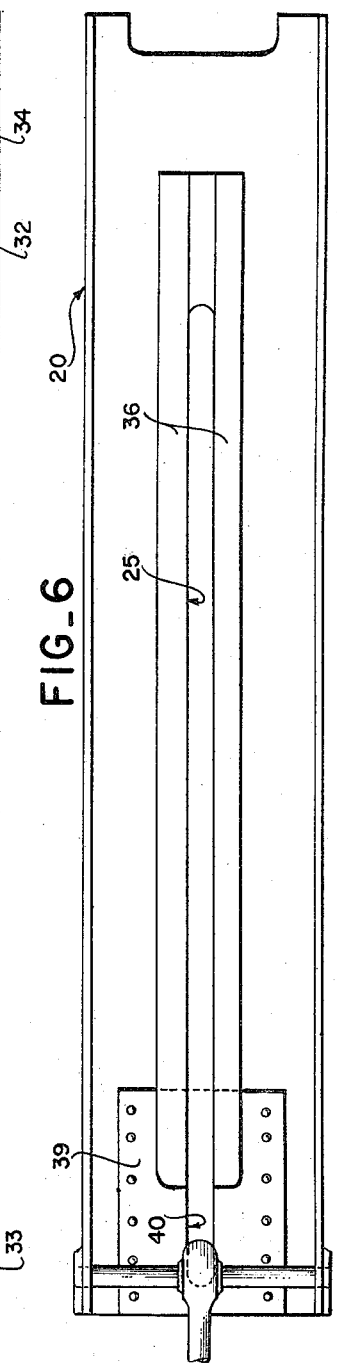

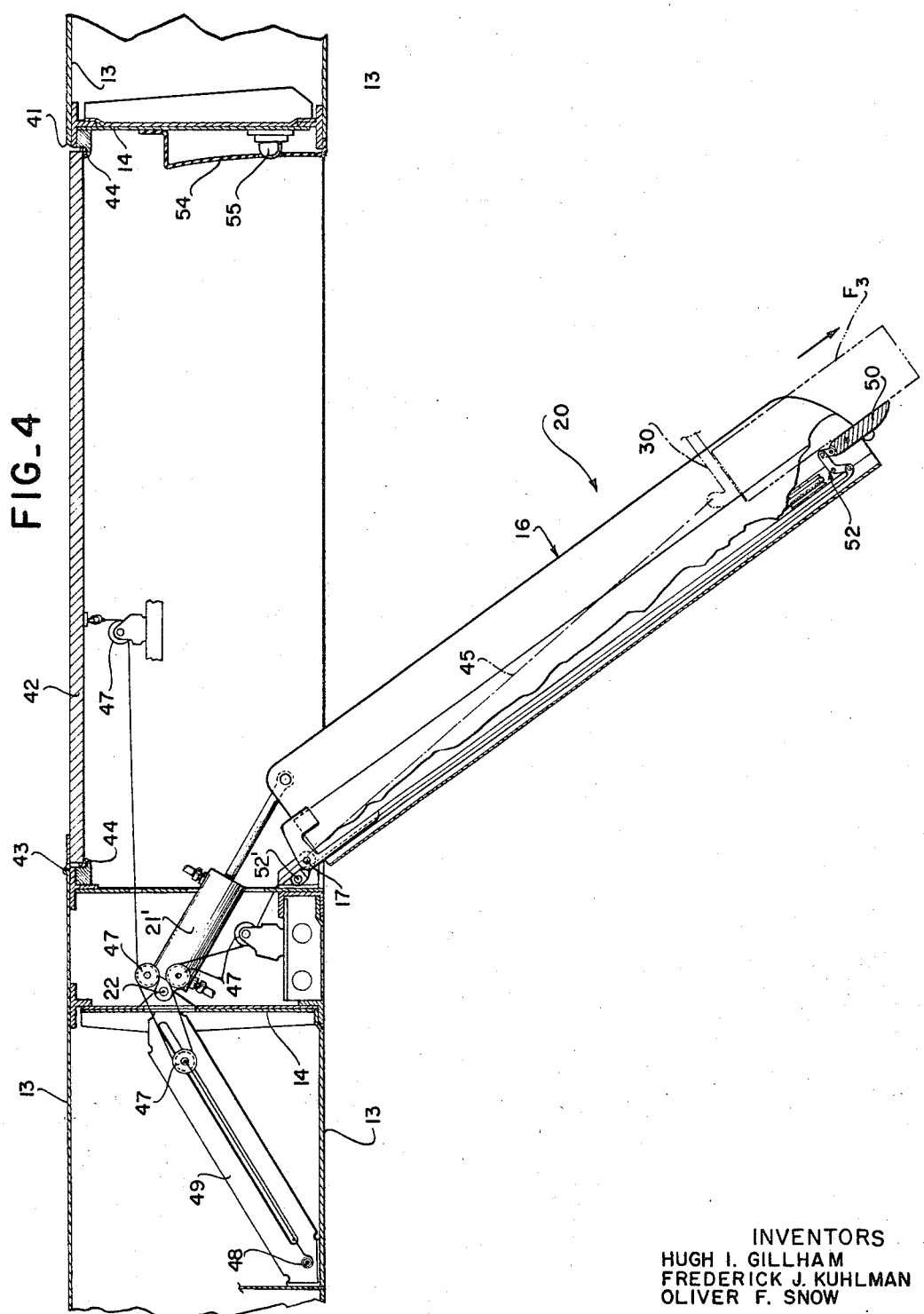

3,379,096
STORES MOUNTING AND EJECTING
MECHANISM FOR AIRCRAFT
Hugh I. Gillham, Marietta, and Frederick J. Kuhlman and Oliver F. Snow, Atlanta, Ga., assignors to Lockheed Aircraft Corporation, Burbank, Calif.
Filed Sept. 20, 1965, Ser. No. 488,558
2 Claims. (Cl. 89—1.5)

ABSTRACT OF THE DISCLOSURE

A launcher is provided that automatically cocks and automatically fires flares or other ejectable stores such as bombs, etc. from aircraft. This launcher is retractable into and extendable from an airplane and insures: (a) accommodation in the airplane of multiple flares or stores of various sizes; (b) automatic flare release at the end of the extension cycle; (c) flush airplane contour in retracted position; (d) automatic cocking of the movable mechanism during loading; (e) sealing of the internal airplane pressure at all times; and (f) re-loading of flares or stores during aircraft flight.

---

This invention relates broadly to the art of launching or ejecting stores from aircraft during flight, and more particularly to a mechanism adapted to accommodate a variety of stores covering a range of preselected sizes and types and by which each selected store may be mounted therein in a safe, stowed position and positively and accurately ejected therefrom when desired, being automatically armed or energized during the ejection operation for subsequent detonation at the desired time.

While the present invention has general application and utility, it is especially adapted for use in the class of aircraft primarily employed in support of surface operations involving searching and rescuing missions, camouflaging surface activities and facilities, and the like. In such employment this aircraft must be capable of varied and diverse operations in a single mission requiring, among other things, a full complement of stored flares serving when detonated or fired to illuminate surface areas, to generate audible signals, to lay a blanket of protective cover in the form of smoke, to cover or paint a surface and thereby mark a location, etc.

In addition to these varied operations such aircraft is required to possess performance capabilities that make it necessary that they have pressurized interiors. It is not possible therefore under certain operating conditions of the aircraft to launch the several and/or different flares through openings in the aircraft which might expose the pressurized interior to the ambient exterior pressure. This is aggravated by the fact that it is most desirable that each mounting and launching mechanism be available for repeated use in the course of a mission requiring loading thereof from the interior of the aircraft.

In order to perform efficiently it is desirable that the flare mounting and ejecting mechanism upon loading of the flare therein, secure it in a substantially immovable position, ready for instantaneous ejection and arming for subsequent detonation at the predetermined time during or proximate ejection. Moreover, the direction of the ejected flare should be controlled to ensure both a clean separation thereof from the aircraft and a strike in the target area.

The present invention contemplates means to satisfy the above requirements as well as to ensure the reliability and efficient operation of the flare mounting and launching mechanism without a penalty to the total performance of the aircraft. Thus, in its inoperative position, this mechanism is disposed entirely within the contour of the aircraft where it is accessible from the interior of the aircraft for loading and reloading after each launch without any appreciable loss or reduction in pressurization in the interior of the aircraft.

When operative, i.e., during ejection of a flare therefrom, the mechanism herein proposed is capable of maintaining the internal pressurized condition. Subsequent to such ejection the mechanism is ready for immediate reloading of the next selected flare which is simultaneously cocked or set for ejection. Such loading and launching is accomplished in such a manner that multiple of these mechanisms within the aircraft may be integrated into a total system for the sequential launching of flares of the same or various type, or in salvos.

At the same time, the mounting and ejecting mechanism is adjustable to receive any one of a preselected size and type of flare and retain it in a fixed position set to forcibly eject it from the aircraft when desired. Means is included to guide its path of movement during such ejection and to automatically arm it for subsequent detonation in accordance with and response to a predetermined condition or event, such as impact, atmospheric pressure, lapse of time, etc.

With the above and other objects in view, as will be apparent, this invention consists in the construction, combination and arrangement of parts all as hereinafter more fully described, claimed and illustrated in the accompanying drawings wherein:

FIGURE 1 is a general schematic of the aft end of an aircraft with a flare mounting and ejecting mechanism constructed in accordance with the teaching hereof mounted therein and disposed in its operative, flare ejecting position with the inoperative, i.e., flare storing and flare loading position being shown in phantom lines;

FIGURE 2 is a transverse section taken through a fragment of the aircraft to show multiple such flare mounting and ejecting mechanisms installed side by side therein;

FIGURE 3 is a section taken along line 3—3 of FIGURE 2 showing the mounting and ejecting mechanism in the flare loading and flare storing position;

FIGURE 4 is a similar section showing the mounting and ejecting mechanism in the operative, flare ejecting position;

FIGURE 5 is a plan view of the lower component of the mounting and ejecting mechanism to show the engaging and cocking device for the flare in the stored position; and FIGURE 6 is a plan view of the flare supporting and guide member that overlies the device shown in FIGURE 5.

Referring more particularly to the drawings, 10 designates a portion of an aircraft containing an interior compartment 11 accessible to personnel with the aircraft. At its aft end the compartment 11 is defined by a wall 12 formed by a pair of spaced skins 13 separated by a series of perpendicularly disposed fore and aft and lateral bulkheads 14 which create and define a plurality of discrete, generally rectangular chambers 15 with their longer dimensions extending longitudinally of the aircraft 10. The outer skin 13 forms the external surface of the aircraft 10 and is contoured for aerodynamic purposes whereby the relative size of the several chambers 15 varies. For all intents and purposes, however, these chambers 15 are identical, one with the other, each adapted to accommodate an identical flare mounting and ejecting mechanism 16 as herein proposed. The description that follows is therefore directed to a single mounting and ejection mechanism, it being understood that one or more such mechanisms may comprise a particular installation.

Each flare mounting and ejecting mechanism 16 pivotally mounted adjacent its forward ("forward" and "aft"

as hereinafter used is with reference to the direction of flight of the aircraft 10 indicated by the large arrow, FIGURE 3) end on a hinge 17 carried by stationary structure internally of the aircraft 10 to thereby swing to and from extreme positions wholly within the contour of the aircraft and projecting at an angle outwardly thereof. To this end, the outer skin 13 defining the chamber 15 is slotted as at 18, and the mechanism 16 carries a fairing 19 secured to and projecting from its under side that is disposed in the plane of the associated skin when the mechanism 16 is disposed in its retracted position within the aircraft 10. Thus disposed, the fairing 19 substantially fills and closes the slot 18 with its outer surface forming a smooth continuation of the skin 13.

The mechanism 16 essentially comprises a launcher chute 20 mounted on the hinge 17 as described and to which the fairing 19 is attached, an ejector carriage 21 mounted on the chute 20 for linear movement thereon, and a power actuator 21' pivotally connected as at 22 at one of its ends to stationary structure internally of the aircraft and at its other end to the chute 20 in spaced relation to the hinge 17 thereby operative to swing the chute 20 and carriage 21 to and from the protracted and retracted positions. More specifically, the chute 20 is formed by a pair of channel or U-shaped trays 23 and 24 secured together as a unitary structure with the base of one telescoped within the sides of the other and spaced from its base. The upper tray 23 is pierced at its transverse center by a slot 25 that extends longitudinally thereof terminating short of the aft end of the tray 23.

Mounted in a fixed position between the bases of the trays 23 and 24 is a pair of blocks 26 each substantially coextensive in length with and disposed one on either side of the slot 25. The adjacent faces of the blocks 26 are cut out to form channels 27 to receive and retain one or more wheels 28 mounted on each side of the ejector carriage 21 which is thereby freely rollable on the chute 20. The carriage 21 is generally rectangular in shape with a wheel 28 rotatably mounted thereon in a vertical position near each of its corners and is formed or otherwise provided with an upstanding neck 29 that passes through the slot 25 and terminates in a plate 30. Preferably, the plate 30 is diamond shaped and may be cut out centrally as at 31 to minimize its weight.

At its aft end the carriage 21 is connected in any appropriate manner to corresponding ends of a pair of resilient members, e.g., bungees 32. The opposite ends of such members or bungees 32 are each secured to a fitting 33 mounted on each corresponding side of the lower tray 24 adjacent the forward end thereof. Intermediate its length each bungee 32 passes around a pulley 34 mounted on a fixed pivot projecting from the upper surface of the base of the lower tray 24 adjacent the aft end thereof. Thus, upon movement of the carriage 21 and its plate 30 in a forward direction, the bungees 32 are loaded in tension and when free to operate forcibly move the plate 30 aftward to the end of the slot 25. Cushion means in the form of a rubber bumper 35 is provided at this end of each track 26 to contact the carriage 21 and thereby dampen or snub its movement in coming to rest.

On the upper surface of the base of the upper tray 23 is mounted a support and guide member 36 having an upper surface that conforms to for mating cooperation with a flare to be disposed thereon. This member is substantially coextensive in length with the slot 25 and blocks or tracks 26; and where the various flares indicated at $F_1$, $F_2$, and $F_3$ are cylindrical in shape, the upper surface may be arcuately grooved as at 38 to receive it peripherally therein to prevent its lateral relative movement.

In order to facilitate mounting of the carriage 21 and its plate 30 on the chute 20 in the above manner, the forward end of the slot 25 may be enlarged and subsequently closed by a cover 39 secured by conventional fastener means. This cover 39 is recessed at its aft end to accommodate the associated end of the member 36 and is slotted centrally as at 40 so that when assembled the slot 25 is extended thereby to establish the total travel of the carriage 21 on the chute 20. Such travel is determined by the length of the longest flare $F_1$ to be mounted in and ejected by the mechanism 16.

The inner skin 13 defining the chamber 15 is pierced by an opening 41 generally corresponding to the slot 18 in the outer skin 13. A closure 42 hinged as at 43 to the edge of the skin 13 defining the opening 41 at and along its forward end is adapted to seat within and fill the opening 41 and maintain it airtight by means of and through an appropriate seal 44 around the edges thereof. The closure 42 is held in position within the opening 41 by suitable connector means such as indicated at 44'. Preferably, the hinge 43 is such as to allow substantially 180° rotation of the closure 42 to permit virtually unrestricted access to the interior of the chamber 15 and to minimize the possibility of damage to the closure 42 when disposed in the open position.

A connection established between the ejector plate 30 and the closure 42 serves to cock the ejector plate 30 prior to each loading and reloading of a store $F_1$, $F_2$, or $F_3$. This connection is effected by means of and through a taut cable 45 connected at opposite ends to the forward face of the plate 30 and the inner surface of the closure 42 through appropriate fittings 46. Intermediate its length this cable passes over and around a number of pulleys 47 mounted in conventional manner to stationary structure of the aircraft 10. Its taut condition is maintained at all times and in all positions of its adjustment by a torsion spring 48 operatively connected to one of the pulleys 47 that is slidably mounted in a stationary track 49.

In view of the foregoing construction and arrangement, opening of the closure 42 by swinging it inwardly of the compartment 11 (indicated by the arc, FIGURES 1 and 3) gives access to the chamber 15 and simultaneously cocks the ejector plate 30 by moving it in the forward direction in opposition to the bungees 32. At this time the fairing 19 is disposed within the slot 18 to substantially prevent depressurization of the compartment 11. When a selected flare $F_1$, $F_2$, or $F_3$ is placed in the chamber 15 on the guide 36, it is cradled therein in the groove 38 against relative lateral movement. As the closure 42 is closed the bungees 32 are allowed to contract forcing the ejector plate 30 to move aft in its tracks 26 and contact the associated end of the flare $F_1$, $F_2$, or $F_3$ regardless of its length. The cable 45 is maintained taut by the operation of the torsion spring 48 and the adjustment of the movable pulley 47 in its track 49.

Acting in opposition to the ejector plate 30 thus disposed is a bearing plate 50 pivotally mounted as at 51 to the launcher chute 20 adjacent the aft end thereof and releasably secured in a vertical position overlying the end of the chute by a locking mechanism 52. This locking mechanism consists of a push-pull linkage train connected at one end to fixed structure as at 52' internally of the aircraft 10 and at its other end to the bearing plate 50 through a bellcrank lever 53. Thus, the bearing plate 50 is thereby rotated concurrently with the swinging of the chute 20 to and from its retracted and protracted positions disposing it in the position closing the chute 20 referred to above and a position at right angles thereto opening and extending the tray 23 of the chute 20.

The bulkhead 14 at the aft end of the chamber 15 carries an arcuate ramp 54 mounted thereon and projecting therefrom to contact the adjacent surface of the bearing plate 50 and ensure a relatively snug fit as well as to limit the retraction of the chute 20 into the chamber 15. A localized opening pierces this ramp 54 for the projection therethrough of an uplock element to secure the chute 20 in its fully retracted position, such uplock element comprising a projection 55 carried by the bukhead 14 for coaction with a similar projection 55 carried by the bearing plate 50. Both projections 55 are formed of resilient material, such as rubber or the like, with curved surfaces disposed in a common plane and overlapping one another when the chute is retracted with its fairing 19 seated within the opening 18.

When the actuator 21' is operated in the conventional manner through standard controls, its extension causes the rotation of the chute assembly 20 about the hinge 17. The uplock 55 is thereby overpowered and when the chute 20 reaches its fully extended position, the bearing plate 50 has been rotated by its linkage 52 opening the chute 20. The bungees 32 are now free to relieve their tension, driving the plate 30 aft whereby the flare $F_1$, $F_2$, or $F_3$ is ejected from the mechanism 16. During such ejection the flare $F_1$, $F_2$, or $F_3$ slides along the guide member 36 which confines it to a linear path assuring its direction.

The several flares $F_1$, $F_2$, and $F_3$ each carry a lanyard connected to an arming mechanism internally thereof which when disconnected energizes the mechanism for subsequent detonation of the flare upon occurrence of a predetermined event such as impact, the lapse of time, change in pressure, or the like. Means in the form of an anchored fitting 56 is associated with each mechanism 16 to effect this disconnection. Thus, a fitting 56 is mounted on stationary structure, e.g., a bulkhead 14, to be disposed within each chamber 15 and readily accessible through opening 41 when the closure 42 is opened. When the flare $F_1$, $F_2$, or $F_3$ is installed in the mechanism 16 as described, the free end of the lanyard is secured to the fitting 56 so that during the ejection of the flare it is automatically withdrawn or disconnected to arm the flare for detonation.

After the flare $F_1$, $F_2$, or $F_3$ has been thus ejected or fired from the chute 20, the actuator 21' is made to contract rotating the chute 20 on its hinge 17 inwardly of the aircraft 10 until the uplock 55 is engaged. At this time the fairing 19 carried by the chute 20 is seated within and fills the opening 18. The closure 42 may now be opened from the compartment 11 without an undue loss of pressurization from the interior of the aircraft 10. Total access now being had to the interior of the chamber 15, the lanyard from the flare $F_1$, $F_2$, or $F_3$ just fired may be removed from the fitting 56 and a new flare $F_1$, $F_2$, or $F_3$ installed in the mechanism 16 and the closure 42 replaced and secured by clamps 44'. The newly installed flare $F_1$, $F_2$, or $F_3$ is now ready for subsequent firing when desired by simply causing the actuator 21 to extend which initiates the flare ejecting operation as described.

The foregoing description is directed specifically to the preferred embodiment of the invention illustrated in the drawings. Such embodiment admits to numerous modifications and equivalents as well as suggests variations which will be apparent to those skilled in the art all within the true spirit and scope of the invention which is to limited only by the initial statement of invention as defined in the appended claims.

What is claimed is:

1. A stores mounting and ejecting mechanism for aircraft during flight comprising:

at least one chamber within an outer wall of said aircraft formed and defined by spaced inner and outer skins separated by partitioning ribs;

a supporting member adapted to receive and retain a store mounted within each said chamber;

an opening in the inner of said skins for access to each chamber from the interior of the aircraft;

a closure associated with each said opening and movable to and from open and closed positions relative thereto;

an ejector plate at one end of said member in abutment with one end of said store;

a bearing plate at the other end of said member in abutment with the other end of said store;

force-applying means connected to and operative constantly on said ejector plate tending to move it toward said bearing plate;

force-resisting means connected to said bearing plate and overpowering said force-applying means whereby the bearing plate is maintained in abutment as aforesaid and said store is secured against substantially all relative movement;

an actuator operative to overcome said force-resisting means whereby said ejector plate is spontaneously moved by said force-applying means driving the store ahead of it and linearly of said supporting member; and a resilient connection between said closure and said ejector plate whereby said ejector plate is moved away from said bearing plate in opposition to said force-applying means when the closure is moved to the open position and whereby said ejector plate is allowed to move toward said bearing plate under the action of said force-applying means when the closure is moved to the closed position.

2. The mechanism of claim 1 including an airtight seal operable between said access opening and said closure in the closed position.

References Cited

UNITED STATES PATENTS

| | | | |
|---|---|---|---|
| 1,621,654 | 3/1927 | Boos | 89—1.5 |
| 1,720,846 | 7/1929 | Mather | 89—1.5 |
| 2,386,839 | 10/1945 | Bronson | 89—1.5 |
| 2,430,617 | 11/1947 | Quinnell et al. | 89—1.5 |
| 2,432,640 | 12/1947 | Wilkes | 89—1.5 |
| 2,937,573 | 5/1960 | Gantschnigg | 89—1.5 |
| 2,971,731 | 2/1961 | Graw | 89—1.5 X |
| 3,295,410 | 1/1967 | Edwards | 89—1.5 |

SAMUEL W. ENGLE, *Primary Examiner.*